United States Patent Office 3,726,894
Patented Apr. 10, 1973

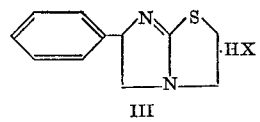

3,726,894
THE COMPOUND 1-(2-HYDROXYETHYL)-4-PHENYL-2-IMIDAZOLIDINETHIONE
Larry Dean Spicer, Princeton, N.J., assignor to American Cyanamid Company, Stamford, Conn.
No Drawing. Filed June 24, 1971, Ser. No. 156,484
Int. Cl. C07d 49/30
U.S. Cl. 260—309.7                1 Claim

ABSTRACT OF THE DISCLOSURE

A process for preparing dl-6-phenyl-2,3,5,6-tetrahydroimidazo[2,1-b]thiazole hydrochloride by contacting 4-phenyl-1-vinyl-2-imidazolidinethione with diborane, oxidizing the resulting product in aqueous base to produce 1-(2-hydroxyethyl)-4-phenyl - 2 - imidazolidinethione, converting the hydroxyethyl grouping to haloethyl and cyclizing to give dl-6-phenyl-2,3,5,6-tetrahydromidazo[2,1-b]thiazole hydrohalide is described.

The products of the invention are useful as highly effective anthelmintic agents.

DESCRIPTION OF THE INVENTION

This invention relates to a process for the preparation of dl-6-phenyl - 2,3,5,6 - tetrahydroimidazo[2,1-b]thiazole hydrohalides.

U.S. Pat. 3,463,786 describes and claims the resolution of dl-6-phenyl - 2,3,5,6 - tetrahydroimidazo[2,1-b]thiazole into its d and l isomers. It was found that most of the anthelmintic activity resides in the l isomer and therefore the d isomer was of little commercial value. On the other hand, co-workers Bullock and Hand found that the d isomer when treated with a strong non-aqueous base undergoes racemization to produce dl-6-phenyl-2,3,5,6-tetrahydroimidazo[2,1-b]thiazole which can then be resolved into the d and l isomers. This invention is described in U.S. application Ser. No. 812,917, filed Apr. 2, 1969, now U.S. Pat. No. 3,673,206. The latter application describes the formation of an unwanted degradation product 1-vinyl-4-phenyl-2-imidazolidinethione.

It has now been found that the latter compound can be transformed into the dl-6-phenyl-2,3,5,6-tetrahydroimidazo[2,1-b]thiazole hydrochloride in essentially a two step process. The latter process involves the conversion of the vinyl side chain into a hydroxy ethyl side chain followed by transformation into a haloethyl side chain which is unstable and cyclizes to produce dl-6-phenyl-2,3,5,6-tetrahydroimidazo[2,1-b]thiazole hydrohalide. The reaction which takes place can be illustrated as follows:

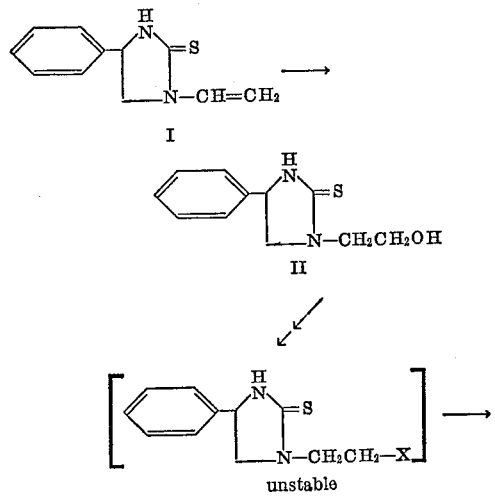

wherein X is halogen.

In accordance with the present invention 4-phenyl-1-vinyl-2-imidazolidinethione is treated with diborane in the presence of an inert solvent such as, for example, tetrahydrofuran, 1,2-dimethoxyethane or 1,2-diethoxyethane. The reaction is preferably carried out in an inert atmosphere such as nitrogen or argon at a temperature between about $-20°$ and $+10°$ C. The reaction mixture is then subjected to oxidation, preferably by treatment with hydrogen peroxide, in the presence of a strong base such as an alkali metal hydroxide. Aqueous solutions of sodium, lithium or potassium hydroxide are preferred. The reaction product 1-(2-hydroxyethyl) - 4 - phenyl-2-imidazolidinethione is then treated with a halogenating agent, such as, for example, thionyl chloride, thionyl bromide, phosphorus tribromide or phosphous oxychloride in the presence of an organic solvent such as chloroform, benzene, tetrahydrofuran, methylene chloride or the like. The reaction may be carried out at a temperature of from 20° to 100° C., but preferably conducted at an elevated temperature between about 50° and 100° C. The process proceeds in two steps. In the first stage the alcohol is converted to the halide. In the second step the halide is isomerized to form the ring closed compound which is now in the form of its hydrohalide. Where the free base is desired, the reaction mixture can be treated with an alkali metal hydroxide of carbonate.

The process of the present invention is useful since it provides a new method of manufacturing dl-6-phenyl-2,3,5,6-tetrahydroimidazo[2,1-b]thiazole hydrohalides and the free base thereof. These compounds are highly effective anthelmintic agents for the treatment of warm-blooded animals. Such compounds are known generically as tetramisole and are presently marketed for the treatment of farm and domestic animals such as sheep, cattle, dogs and the like.

SPECIFIC DISCLOSURE

This invention is further exemplified by the examples which follows.

Example 1.—Preparation of 1-vinyl-4-phenyl-2-imidazolidinethione

To a stirred solution of 113.3 g. (1.0 mole) of potassium t-butoxide in 850 ml. of dry dimethylsulfoxide is added 170 g. (0.832 mole) of d(+)-6-phenyl-2,3,5,6-tetrahydromidazo[2,1-b]thiazole in several portions while cooling to moderate the reaction. The mixture is stirred at ca. 25° C. for four hours and then poured into six liters of ice water. A solid gradually formed and is filtered, washed with water and then t-butyl alcohol. The solid is dried under reduced pressure to give 164.4 g. of crude product, melting point 121–127° C. Recrystallization from acetonitrile gives the analytical sample, melting point 130.5–131.5° C.

Analysis.—Calcd. for $C_{11}H_{12}N_2S$ (percent): C, 64.67; H, 5.92; N, 13.71; S, 15.70. Found (percent): C, 64.80; H, 6.04; N, 13.91; S, 15.49.

Example 2.—Preparation of 1-(2)-hydroxyethyl)-4-phenyl-2-imidazolidinethione

To a stirred solution of 40.80 g. (0.20 mole) of 4-phenyl-1-vinyl-2-imidazolidinethione in 45 ml. of dry tetrahydrofuran, maintained at 0° under nitrogen, is added 230 ml. of 1 M diborane in tetrahydrofuran. After 30 minutes the cooling bath is removed and the mixture stirred an additional 40 minutes. The mixture is then cooled to 0° and 265 ml. of 10% aqueous sodium hydroxide and 25 ml. of 30% hydrogen peroxide are slowly added in sequence. After allowing the mixture to warm to 10°, water and methylene chloride are added. The layers are separated, and the aqueous layer extracted with methylene chloride. The combined organic layers are washed with 10% sodium bisulfite, water, dried over magnesium sulfate and evaporated at reduced pressure to give 35.1 g. of a viscous oil. Purification on silica gel gives the crystalline product, melting point 81–83° C. Recrystallization from nitromethane gives the analytical sample, melting point 81–83° C.

*Analysis.*—Calcd. for $C_{11}H_{14}N_2OS$ (percent): C, 59.43; H, 6.35; N, 12.60; S, 14.42. Found (percent): C, 59.59; H, 6.38; N, 12.61; S, 14.24.

Example 3.—Preparation of *dl*-6-phenyl-2,3,5,6-tetrahydroimidazo[2,1-b]thiazole hydrochloride To a stirred solution of 1.1 g. (0.005 mole) of 1-(2-hydroxyethyl)-4-phenyl-2-imidazolidinethione in 20 ml. of methylene chloride is slowly added 5 ml. of thionyl chloride. The solution is stirred at room temperature for one hour and then at reflux for one hour. The solvent is evaporated at reduced pressure and the residue is treated with chloroform. Distillation of the chloroform gives a white solid which is filtered, washed with acetonitrile and dried to give the product, melting point 249–252° C. Recrystallization from ethanol gives the purified product, melting point 258–261° C.

Where the free base is desired, the reaction mixture containing the *dl*-6-phenyl-2,3,5,6-tetrahydroimidazo[2,1-b]thiazole hydrohalides is treated with a base such as sodium or potassium hydroxide or carbonate.

I claim:

1. The compound 1-(2-hydroxyethyl)-4-phenyl-2-imidazolidinethione.

References Cited

UNITED STATES PATENTS

| | | | |
|---|---|---|---|
| 2,812,333 | 11/1957 | Steele | 260—309.7 |
| 2,816,896 | 12/1957 | McKay et al. | 260—309.7 |
| 2,840,566 | 6/1958 | Yost | 260—309.7 |
| 3,365,426 | 1/1968 | Walles | 260—309.7 |
| 3,673,206 | 6/1972 | Bullock et al. | 260—306.7 |

OTHER REFERENCES

Olszenko-Piontkowa et al.: Chem. Abstr., vol. 72, No. 31692t (1970), QD1.A51.

NATALIE TROUSOF, Primary Examiner

U.S. Cl. X.R.

260—306.7; 424—273